(12) United States Patent  (10) Patent No.: US 8,246,103 B2
Tavlarides  (45) Date of Patent: Aug. 21, 2012

(54) AUTOMOTIVE AIR DEFLECTOR, AND A SYSTEM THEREOF

(76) Inventor: Demetrios Tavlarides, Washington, DC (US)

(*) Notice: Subject to any disclaimer, the term of this patent is extended or adjusted under 35 U.S.C. 154(b) by 372 days.

(21) Appl. No.: 12/457,969

(22) Filed: Jun. 26, 2009

(65) Prior Publication Data
US 2010/0327625 A1 Dec. 30, 2010

(51) Int. Cl.
B62D 35/00 (2006.01)
(52) U.S. Cl. ........................ 296/180.1; 293/102; 280/848
(58) Field of Classification Search .............. 296/180.1, 296/181, 208, 180.3, 180.4; 293/117, 112, 293/102; 280/32, 153.5, 154, 848, 849, 850, 280/851
See application file for complete search history.

(56) References Cited

U.S. PATENT DOCUMENTS

| | | |
|---|---|---|
| 1,485,332 A | 2/1924 | Edwards |
| 1,805,933 A | 5/1931 | Victor |
| 2,817,941 A | 12/1957 | Clapsaddle, Jr. |
| 4,159,140 A * | 6/1979 | Chabot et al. .............. 296/180.5 |
| 4,214,786 A * | 7/1980 | Morrison ................... 296/180.2 |
| 4,258,929 A | 3/1981 | Brandon et al. ........... 280/154.5 |
| 4,421,354 A | 12/1983 | Lemaster .......................... 296/1 |
| 4,455,045 A * | 6/1984 | Wheeler ..................... 296/181.5 |
| 4,640,541 A | 2/1987 | FitzGerald et al. .............. 296/1 |
| 4,781,121 A | 11/1988 | Kumar et al. .................. 104/279 |
| 5,069,403 A * | 12/1991 | Marentic et al. .............. 244/130 |
| 5,074,592 A | 12/1991 | White ............................ 280/851 |
| 5,207,455 A * | 5/1993 | Gotz et al. .................... 280/848 |
| 5,348,328 A | 9/1994 | Millington ....................... 280/63 |
| 5,802,746 A | 9/1998 | Miller ............................... 37/263 |
| 5,833,389 A * | 11/1998 | Sirovich et al. ................. 405/52 |
| 5,848,769 A * | 12/1998 | Fronek et al. ................. 244/200 |
| 6,006,459 A * | 12/1999 | Kosmach ........................ 40/200 |
| 6,033,010 A * | 3/2000 | Preiss ......................... 296/180.1 |
| 6,644,700 B2 * | 11/2003 | Ito et al. ......................... 293/117 |
| 6,742,831 B2 * | 6/2004 | Rees ........................... 296/180.1 |
| 7,070,850 B2 * | 7/2006 | Dietz et al. ..................... 428/172 |
| 7,086,692 B2 * | 8/2006 | Sebastian ...................... 296/198 |
| 7,198,139 B2 | 4/2007 | Wilson et al. ................. 188/264 |
| 7,316,420 B2 * | 1/2008 | Loddo ........................... 280/851 |
| 7,419,188 B2 * | 9/2008 | Nicolai et al. ................ 280/847 |
| 2002/0109347 A1 * | 8/2002 | Sheppard ...................... 280/851 |
| 2004/0256884 A1 | 12/2004 | Schwartz ................... 296/180.4 |
| 2005/0161976 A1 * | 7/2005 | Ortega et al. .............. 296/180.4 |
| 2007/0216194 A1 | 9/2007 | Rober et al. ................. 296/180.1 |
| 2008/0054677 A1 | 3/2008 | McGee ....................... 296/180.1 |
| 2010/0156142 A1 * | 6/2010 | Sumitani et al. ........... 296/180.1 |

* cited by examiner

Primary Examiner — Glenn Dayoan
Assistant Examiner — Pinel Romain
(74) Attorney, Agent, or Firm — Jacobson Holdman PLLC

(57) ABSTRACT

An automotive air deflector is substantially V-shaped with a pair of opposed wing panels configured such that impinging air is directed around the deflector. The deflector is configured for placement at various locations on a vehicle, including on the front end of the vehicle, on the rear end of the vehicle, and in front of the tires of the vehicle. The air deflector is constructed of a lightweight material that is sufficiently rigid for the service environment but is flexible enough to be configured in varying shapes so as to accommodate being placed on various types of vehicles and in the various locations on those vehicles. By reducing turbulence and providing for the smooth flow of air around the vehicle, the air deflector reduces the effect of aerodynamic drag, and thus improves the fuel efficiency of the vehicle, thereby leading to reduced vehicle operating costs.

18 Claims, 21 Drawing Sheets

AUTOMOTIVE AIR DEFLECTOR, AND A SYSTEM THEREOF

BACKGROUND OF THE INVENTION

1. Field of the Invention

The present invention generally relates to a device for reducing the effect of aerodynamic drag on an automotive vehicle. More specifically, the present invention relates to an air deflector for directing air flow around at least one of the front end, the rear end, and the tires of automotive vehicles such as automobiles and trucks so as to improve the aerodynamic characteristics of the vehicles.

2. Description of the Prior Art

Various parts of automotive vehicles interfere with the smooth flow of air around the vehicle during vehicle operation. This interference creates turbulent air flow, and a corresponding increased coefficient of aerodynamic drag. The increased aerodynamic drag requires increased engine power to move the vehicle, thereby leading to decreased fuel efficiency and increased vehicle operating costs. There are, therefore, substantial advantages to be achieved by reducing the turbulence and aerodynamic drag associated with a moving vehicle by altering the flow of air around the vehicle.

Various devices for reducing aerodynamic drag on vehicles, especially trucks, are known. For example, U.S. Pat. No. 4,640,541 discloses an under trailer air deflector for use with a tractor trailer. The deflector consists of a fairing that is suspended beneath the truck or trailer body immediately in front of the rear wheels and that extends completely across the width of the body. The surface of the fairing is curved in both a lateral and a vertical direction to deflect air and entrained water or snow around or under the wheels. The device is formed with a plurality of generally vertical grooves angled toward the center line of the vehicle. The grooves direct air downwardly and between the rear wheels of the vehicle.

However, there can be various drawbacks associated with such conventional devices. For example, the above-described deflector is of relatively complex design, is of fixed shape for a specific vehicle, and is of relatively heavy duty construction for use with a tractor trailer.

Therefore, a need exists for an automotive air deflector that provides the requisite amount of air deflection, but that is of relatively simple design and construction, is easily secured without alteration of the associated vehicle, and can be configured for a wide variety of vehicles, including both automobiles and trucks.

SUMMARY OF THE INVENTION

The present invention overcomes the above-described limitations of the prior art by providing an air deflector that not only provides improved aerodynamic flow around a moving vehicle, but is of relatively simple design and construction, is both easily secured to, and, if desired, removed from, the associated vehicle, and can be configured for mounting in a variety of positions on a variety of types of vehicles.

According to a preferred embodiment of the present invention, the automotive air deflector includes a substantially V-shaped deflecting element having a pair of opposed wing panels configured such that impinging air is directed around an outer surface of the deflecting element. Accordingly, one feature of the present invention is that the deflector reduces turbulence and provides for the improved smooth flow of air around a vehicle. Therefore, the air deflector reduces the effect of aerodynamic drag, and thus improves the fuel efficiency of the vehicle, thereby leading to reduced vehicle operating costs.

Another feature of the present invention is that the deflector is constructed of a relatively lightweight material that is sufficiently rigid for the service environment, yet is flexible enough to be configured in varying shapes and sufficiently capable of retaining the shapes so that it can be adjusted to fit a specific vehicle, and thus can accommodate being placed on various types of vehicles.

Still another feature of the present invention is that the deflector can be constructed in various configurations with a wide range of dimensions so that it can be utilized in various combinations on a specific vehicle, and on various types of vehicles.

Yet another feature of the present invention is that the deflector can be configured for placement at various locations on a vehicle, including on the front end of the vehicle, on the rear end of the vehicle, and in front of the tires of the vehicle.

Another feature of the present invention is that the deflector can be placed in different orientations depending upon the placement location of the deflector on the vehicle.

Still another feature of the present invention is that the deflector can be reversibly deformable, i.e., capable of returning to an original shape if deformed as a result of impact.

According to another embodiment of the present invention, a system of automotive air deflectors is provided in association with a vehicle.

Accordingly, one object of the present invention is to provide an automotive air deflector that includes a substantially V-shaped deflecting element having a pair of opposed wing panels configured such that impinging air is directed around an outer surface of the deflecting element so as to reduce turbulence and provide for the improved smooth flow of air around a vehicle.

Another object of the present invention is to provide a deflector that reduces the effect of aerodynamic drag, and thus improves the fuel efficiency of the vehicle, thereby leading to reduced vehicle operating costs.

Still another object of the present invention is to provide a deflector that is constructed of a relatively lightweight material that is sufficiently rigid for the service environment, yet is flexible enough to be configured in varying shapes and sufficiently capable of retaining the shapes so that it can be adjusted to fit a specific vehicle, and thus can accommodate being placed on various types of vehicles.

Yet another object of the present invention is to provide a deflector that can be constructed in various configurations with a wide range of dimensions so that it can be utilized in various combinations on a specific vehicle, and on various types of vehicles.

Another object of the present invention is to provide a deflector that can be configured for placement at various locations on a vehicle, including on the front end of the vehicle, on the rear end of the vehicle, and in front of the tires of the vehicle.

Still another object of the present invention is to provide a deflector that can be placed in different orientations depending upon the placement location of the deflector on the vehicle.

Yet another object of the present invention is to provide a deflector that is reversibly deformable, i.e., capable of returning to an original shape if deformed as a result of impact.

Another object of the present invention is to provide a system of automotive air deflectors in association with a vehicle.

And, still another object of this invention to be specifically enumerated herein is to provide an automotive air deflector in accordance with the preceding objects that will conform to conventional forms of manufacture, be of relatively simple construction and easy to use so as to provide an automotive air deflector that will be economically feasible, long lasting, durable in service, relatively trouble free in operation, and a general improvement in the art.

These together with other objects and advantages which will become subsequently apparent reside in the details of construction and operation as more fully hereinafter described and claimed, reference being had to the accompanying drawings forming a part hereof, wherein like reference numbers refer to like parts throughout. The accompanying drawings are intended to illustrate the invention, but are not necessarily to scale.

DETAILED DESCRIPTION OF THE PREFERRED EMBODIMENTS

Figure 1:
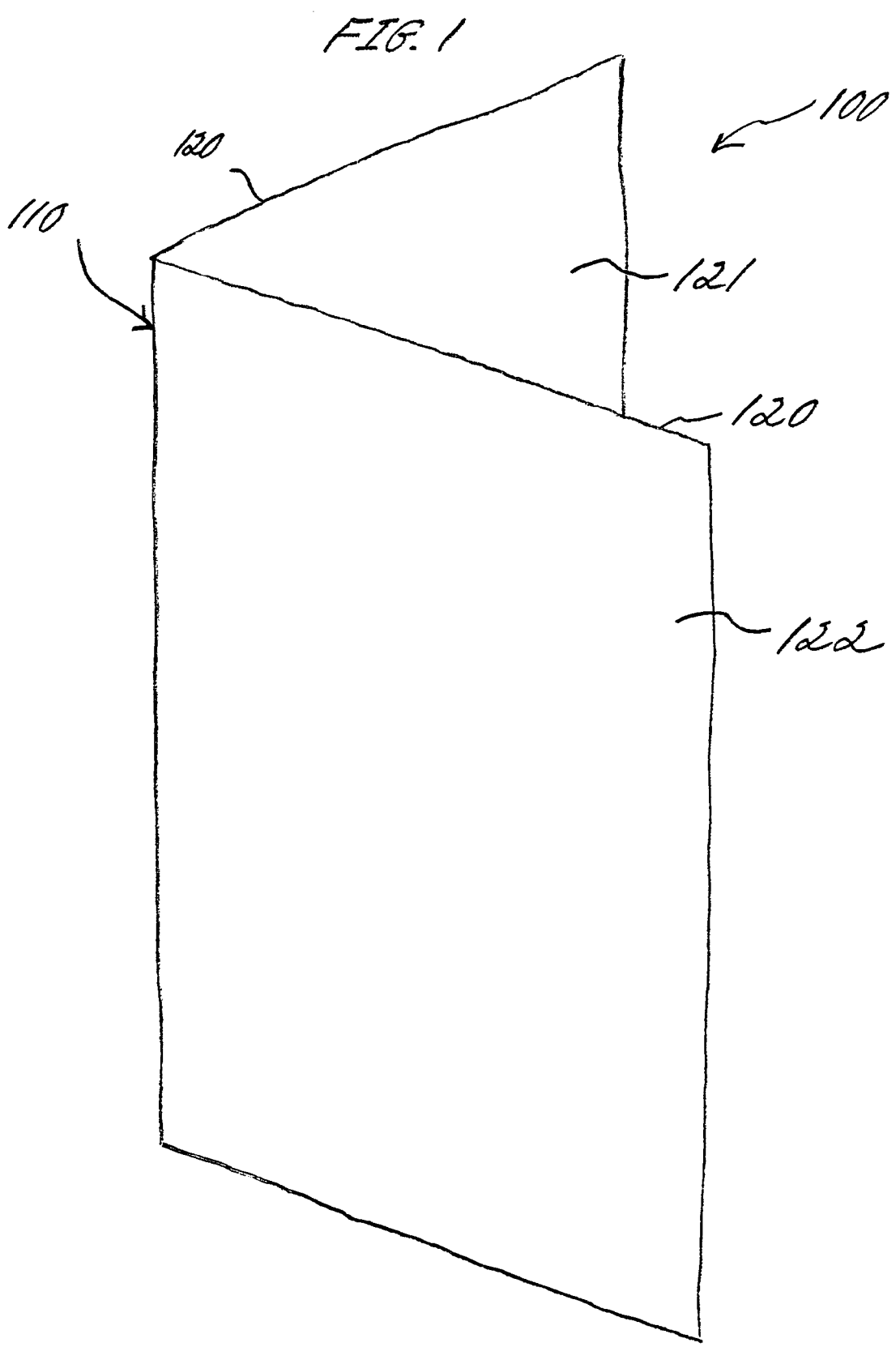
FIG. 1 is a perspective view of an automotive air deflector constructed in accordance with a first embodiment of the present invention.

Although preferred embodiments of the invention are explained in detail, it is to be understood that other embodiments are possible. Accordingly, it is not intended that the invention is to be limited in its scope to the details of constructions, and arrangement of components set forth in the following description or illustrated in the drawings. The invention is capable of other embodiments and of being practiced or carried out in various ways. Also, in describing the preferred embodiments, specific terminology will be resorted to for the sake of clarity. For example, one embodiment of the invention is described as being capable of directing impinging air laterally around the "tire" of a vehicle. Although the term "tire" is used in the interest of brevity, the air is of course directed around the entire tire/wheel assembly. It is to be understood that each specific term includes all technical equivalents that operate in a similar manner to accomplish a similar purpose. Where possible, components of the drawings that are alike are identified by the same reference numbers.

Figure 2:
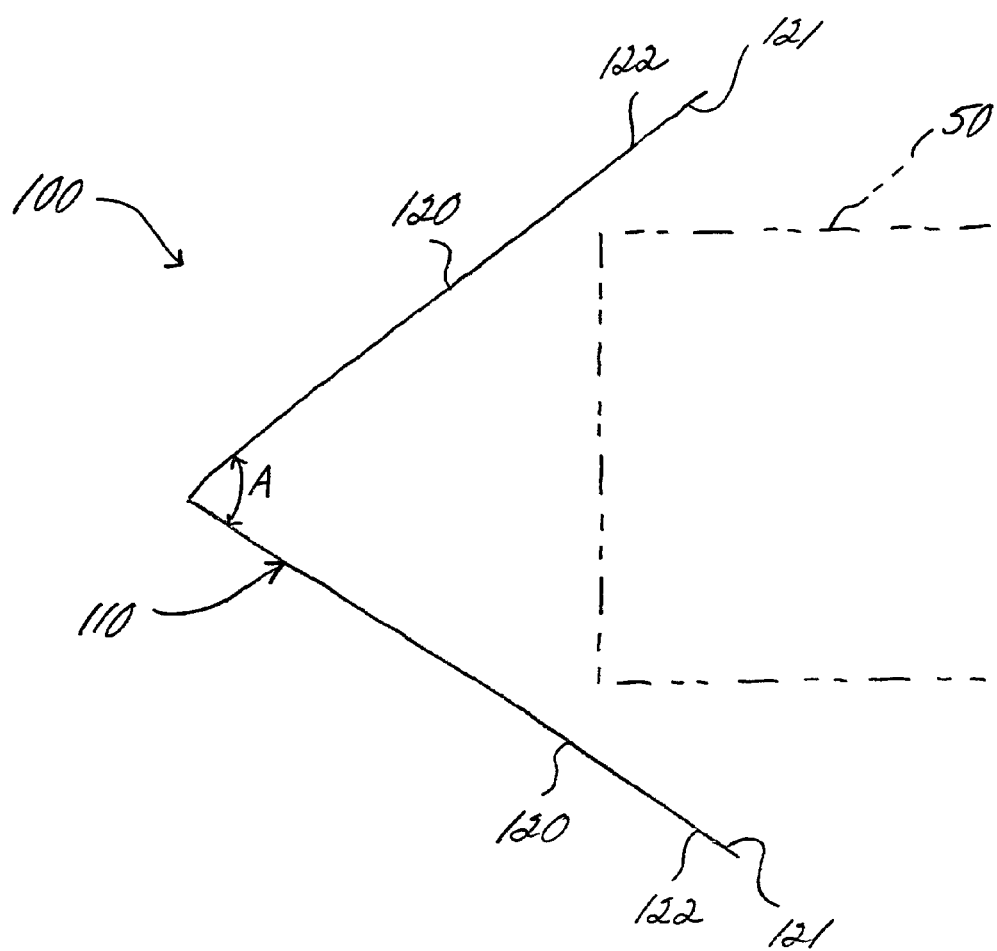
FIG. 2 is a plan view of the deflector shown in FIG. 1 positioned in association with a tire of a vehicle.

Referring now specifically to FIGS. 1 and 2 of the drawings, an automotive air deflector in accordance with a first embodiment of the present invention is generally designated by reference number 100. The deflector 100 includes a substantially V-shaped deflecting element 110 having a pair of opposed wing panels 120 each having an inner surface 121 and an outer surface 122 configured such that impinging air is directed around the outer surface 122 of the deflecting element 110.

Figure 11:
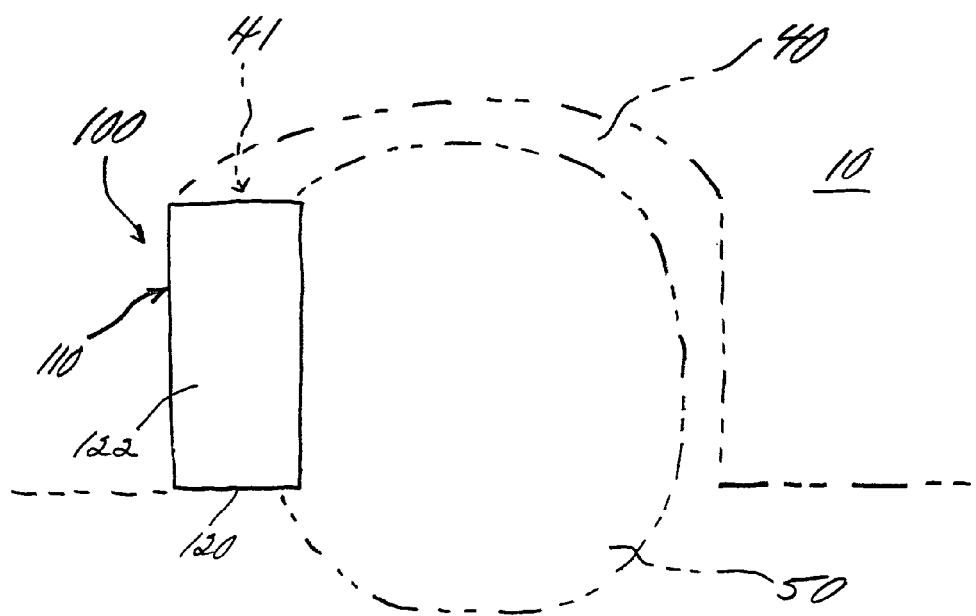
FIG. 11 is a side view of the deflector shown in FIG. 1 positioned in association with a tire of a vehicle.
Figure 12:
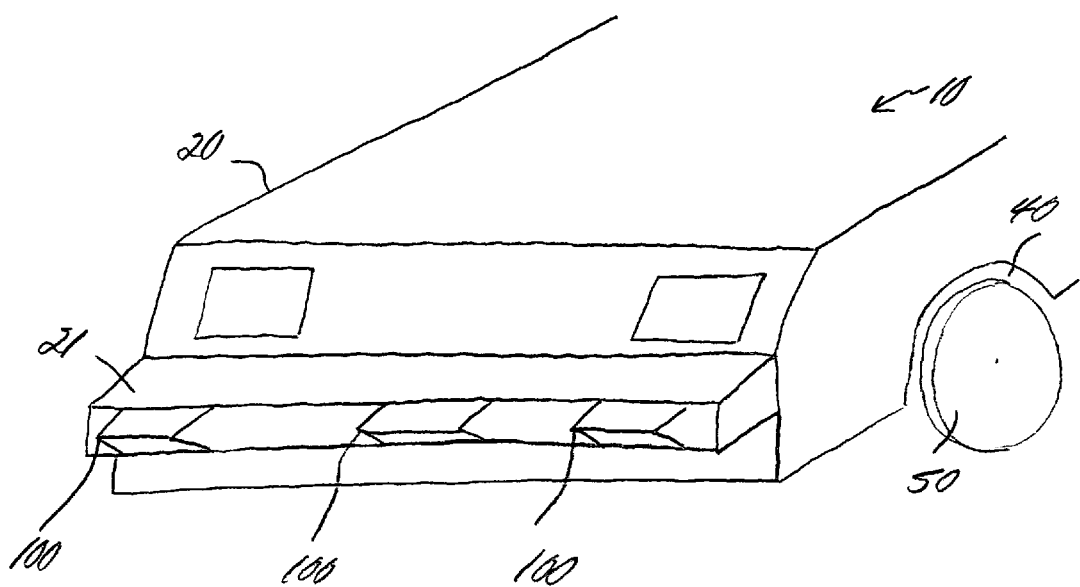
FIG. 12 is a perspective view of a plurality of the deflectors shown in FIG. 1 positioned in a substantially horizontal orientation on a front end of a vehicle.
Figure 13:
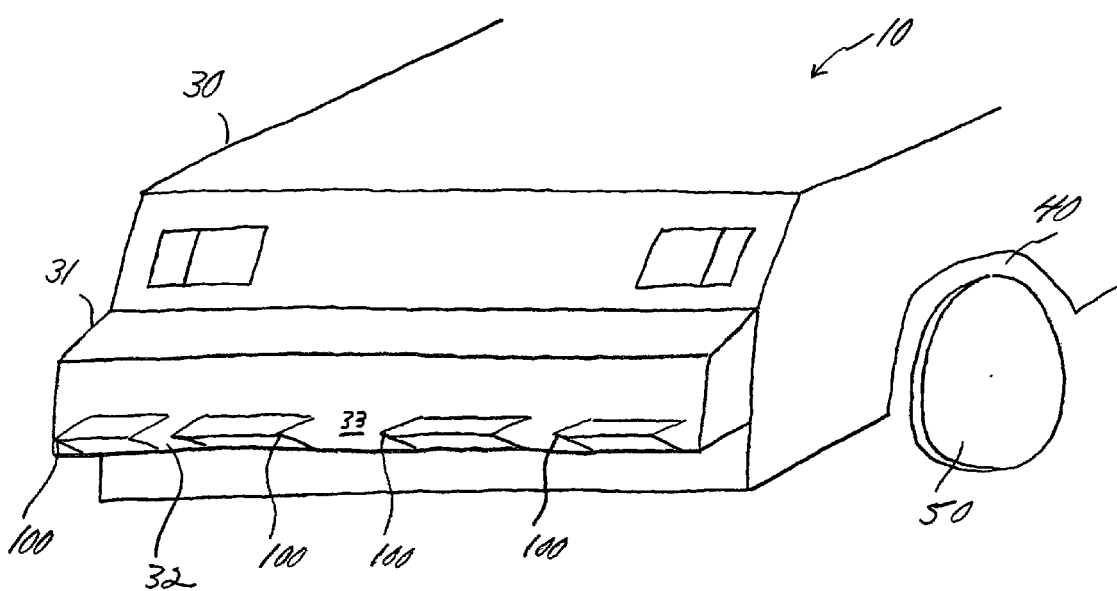
FIG. 13 is a perspective view of a plurality of the deflectors shown in FIG. 1 positioned in a substantially horizontal orientation on a rear end of a vehicle.

For purposes of illustration, the deflector 100 is described and illustrated in conjunction with an automobile 10. As shown in FIGS. 11, 12, and 13, the automobile 10 generally includes a front end 20 with a front bumper 21, a rear end 30 with a rear bumper 31, and a plurality of wheel wells 40 each having a tire 50 therein.

According to one embodiment of the invention, the deflector 100 is adapted to be positioned within the wheel well 40 in front of a rear tire 50. As shown in FIG. 11, the deflector 100 is positioned in a substantially vertical orientation, and as shown in FIG. 2, is positioned so as to direct air equally around each side of tire 50. The deflector 100 is positioned sufficiently low in the wheel well 40 so as to maximize the deflection of air around the tire 50, but sufficiently high to avoid road level obstructions. The deflector 100 is secured to a wheel well front portion 41 with suitable fasteners 90, such as, for example, sheet metal screws or threaded fasteners. By virtue of employing the aforementioned fasteners, the deflector 100 can be securely, but reversibly, attached, so that it can easily be repositioned or replaced.

Figure 6:
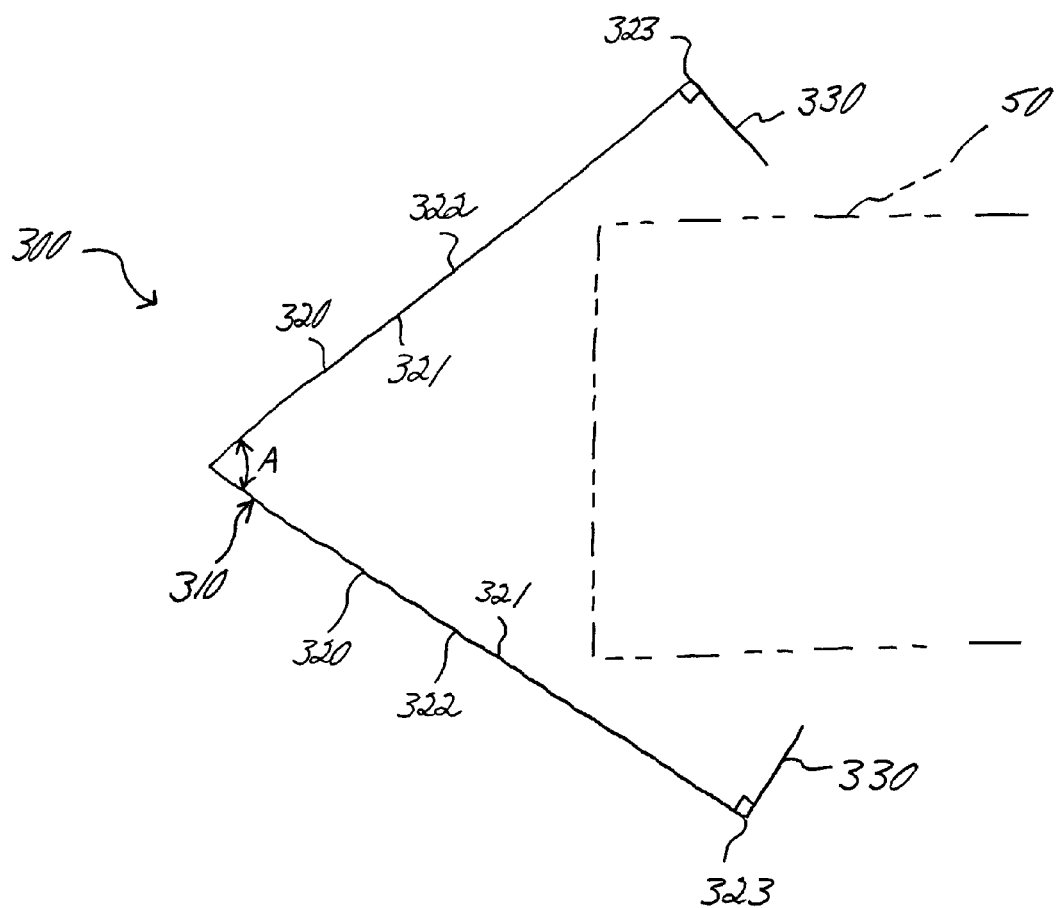
FIG. 6 is a plan view of the deflector shown in FIG. 5 positioned in association with a tire of a vehicle.

The deflector 100 can be constructed in various configurations with a wide range of dimensions so that it can be utilized on various types of vehicles. For example, according to a preferred embodiment of the deflector 100 for use with a passenger automobile, the deflecting element 110 has an interior angle "A" between the wing panels 120 of from approximately 80° to approximately 100°, has a height of approximately 10", and the wing panels 120 each have a width of approximately 7.5". According to a more preferred embodiment of the invention, the angle between the wing panels 120 is approximately 90° as shown in FIG. 6. However, the exact angle between the wing panels 120, and the associated height and width of the deflecting element 110, are of course dependent not only upon the desired amount of air deflection, but upon the available space within the wheel well 40 and the size of the vehicle tire 50.

A feature of the present invention is that the deflector 100 can be constructed of a relatively lightweight material that is sufficiently rigid for the automotive service environment, yet is flexible enough to be configured in varying shapes and sufficiently capable of retaining the shapes so that it can be adjusted to fit a specific vehicle, and thus can accommodate being placed on various types of vehicles. The material of construction of the deflector 100 can be, for example, a sheet metal or another easily shaped and bent, relatively lightweight metal.

According to another embodiment of the invention, instead of being constructed of a lightweight metal that may irreversibly bend upon impact, the deflector 100 can be reversibly deformable, i.e., constructed of a material capable of returning to an original shape if deformed as a result of impact. The material of construction of the deformable embodiment of the deflector 100 can be, for example, an elastically deformable thermoplastic.

Road testing of the deflector 100 with a passenger vehicle demonstrated the improved aerodynamic characteristics as evidenced by improved fuel efficiency, i.e., better gasoline mileage. The test vehicle was a 2003 Jeep® Cherokee using regular unleaded gasoline. The vehicle was driven under city driving conditions at speeds of up to 30 miles per hour. The vehicle was first driven without the deflectors 100, and achieved an average fuel mileage of 8.0 miles per gallon. A deflector 100 was then mounted as shown in FIG. 11 in front of each of the rear tires 50. The vehicle was again driven under city driving conditions at speeds of up to 30 miles per hour along an identical route under comparable traffic conditions and achieved an average fuel mileage of 12.0 miles per gallon. Therefore, by virtue of utilizing the deflectors 100, the fuel mileage improved by approximately 50%.

Figure 3:
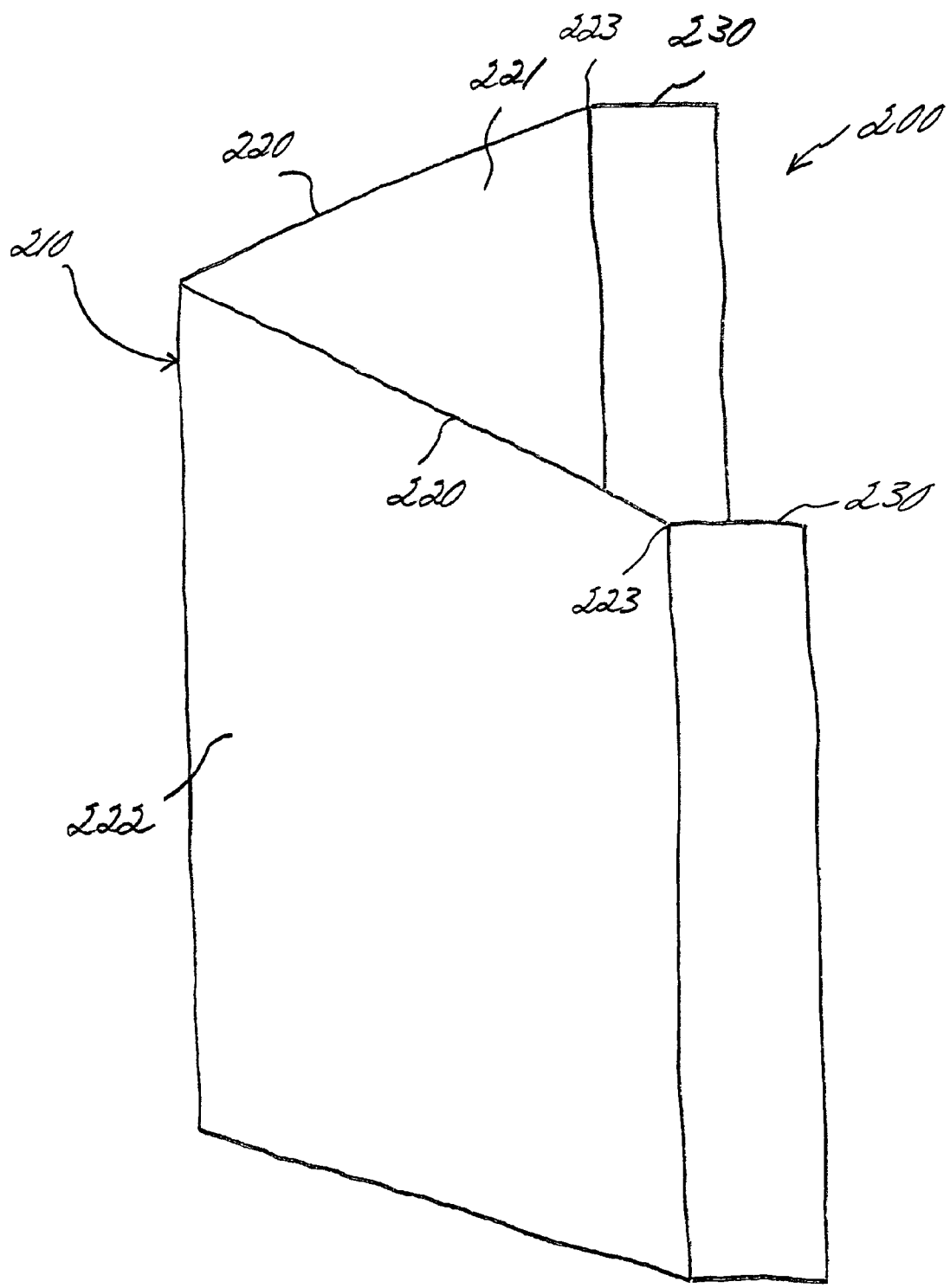
FIG. 3 is a perspective view of an automotive air deflector constructed in accordance with a second embodiment of the present invention.
Figure 4:
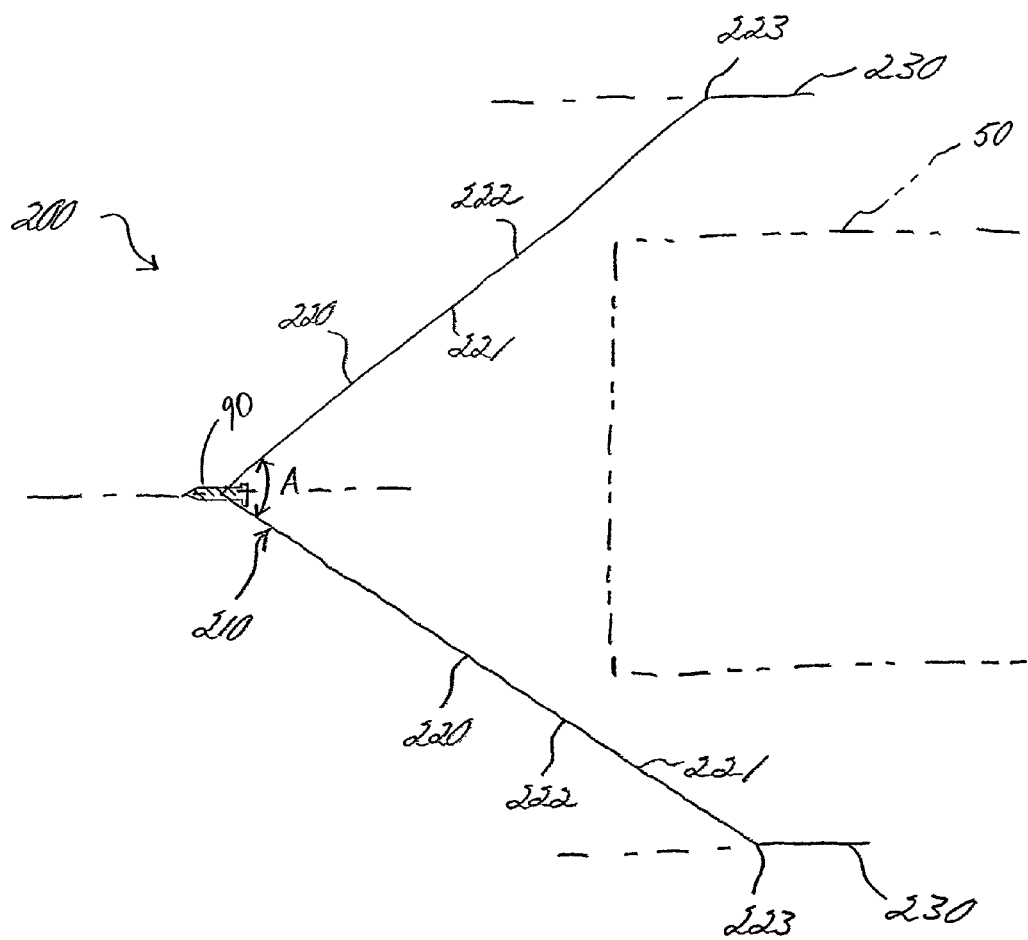
FIG. 4 is a plan view of the deflector shown in FIG. 3 positioned in association with a tire of a vehicle.

Referring now specifically to FIGS. 3 and 4 of the drawings, an automotive air deflector in accordance with a second embodiment of the present invention is generally designated by reference number 200. The deflector 200 includes a substantially V-shaped deflecting element 210 having a pair of opposed wing panels 220 each having an inner surface 221 and an outer surface 222 configured such that impinging air is directed around the outer surface 222 of the deflecting element 210. To further reduce the effect of aerodynamic drag, the deflecting element 210 includes a wing extension 230 on each of the wing panels 220. The wing extensions 230 extend from a rear edge 223 of the wing panel 220 and are oriented substantially parallel to a bisector of the angle between the wing panels 220.

Figure 5:
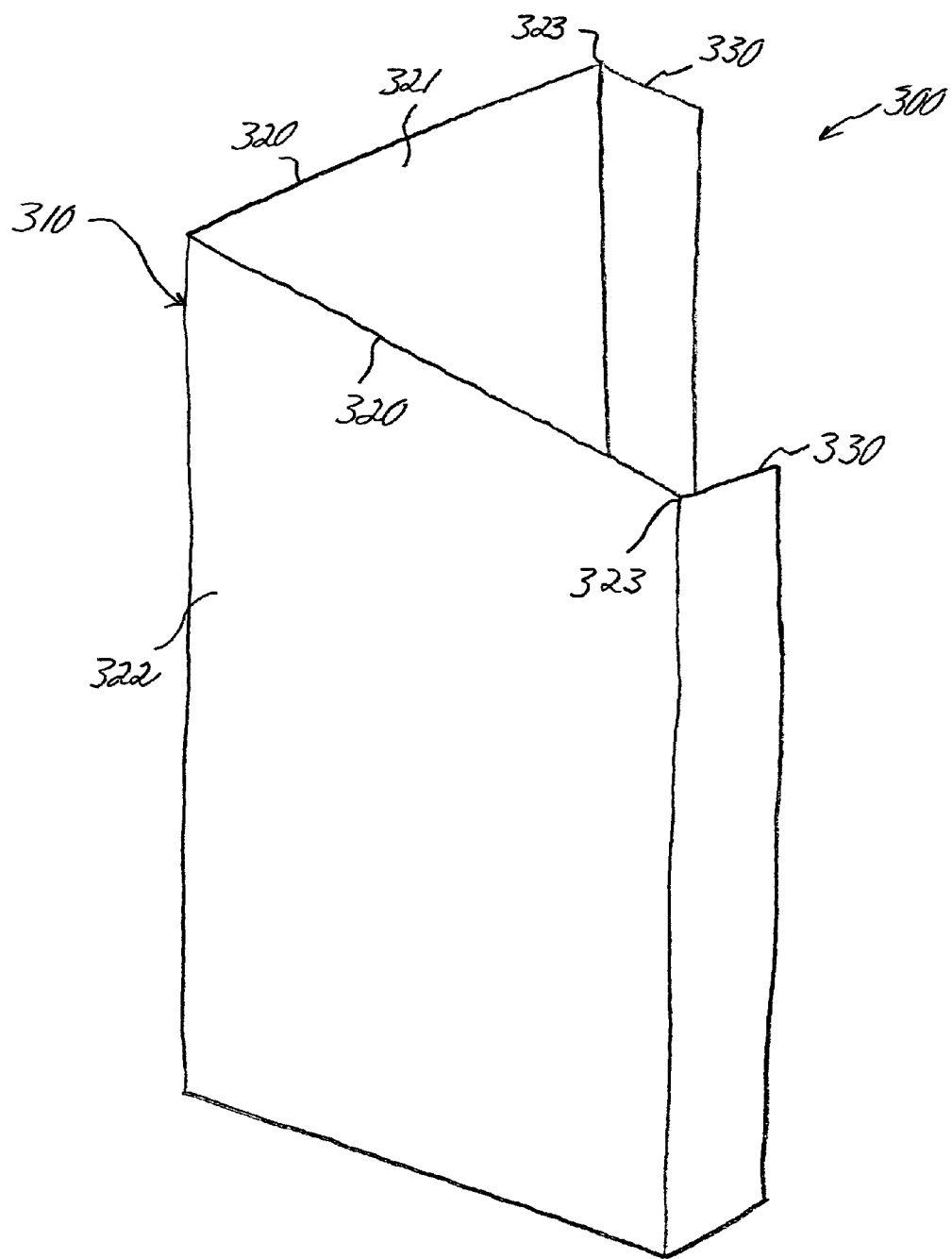
FIG. 5 is a perspective view of an automotive air deflector constructed in accordance with a third embodiment of the present invention.

Referring now specifically to FIGS. 5 and 6 of the drawings, an automotive air deflector in accordance with a third embodiment of the present invention is generally designated by reference number 300. The deflector 300 includes a substantially V-shaped deflecting element 310 having a pair of opposed wing panels 320 each having an inner surface 321 and an outer surface 322 configured such that impinging air is directed around the outer surface 322 of the deflecting element 310. To further reduce the effect of aerodynamic drag, the deflecting element 310 includes a wing extension 330 on each of the wing panels 320. The wing extensions 330 extend from a rear edge 323 of the wing panel 320 and are oriented substantially perpendicular to a plane of the wing panel 320.

Figure 7:
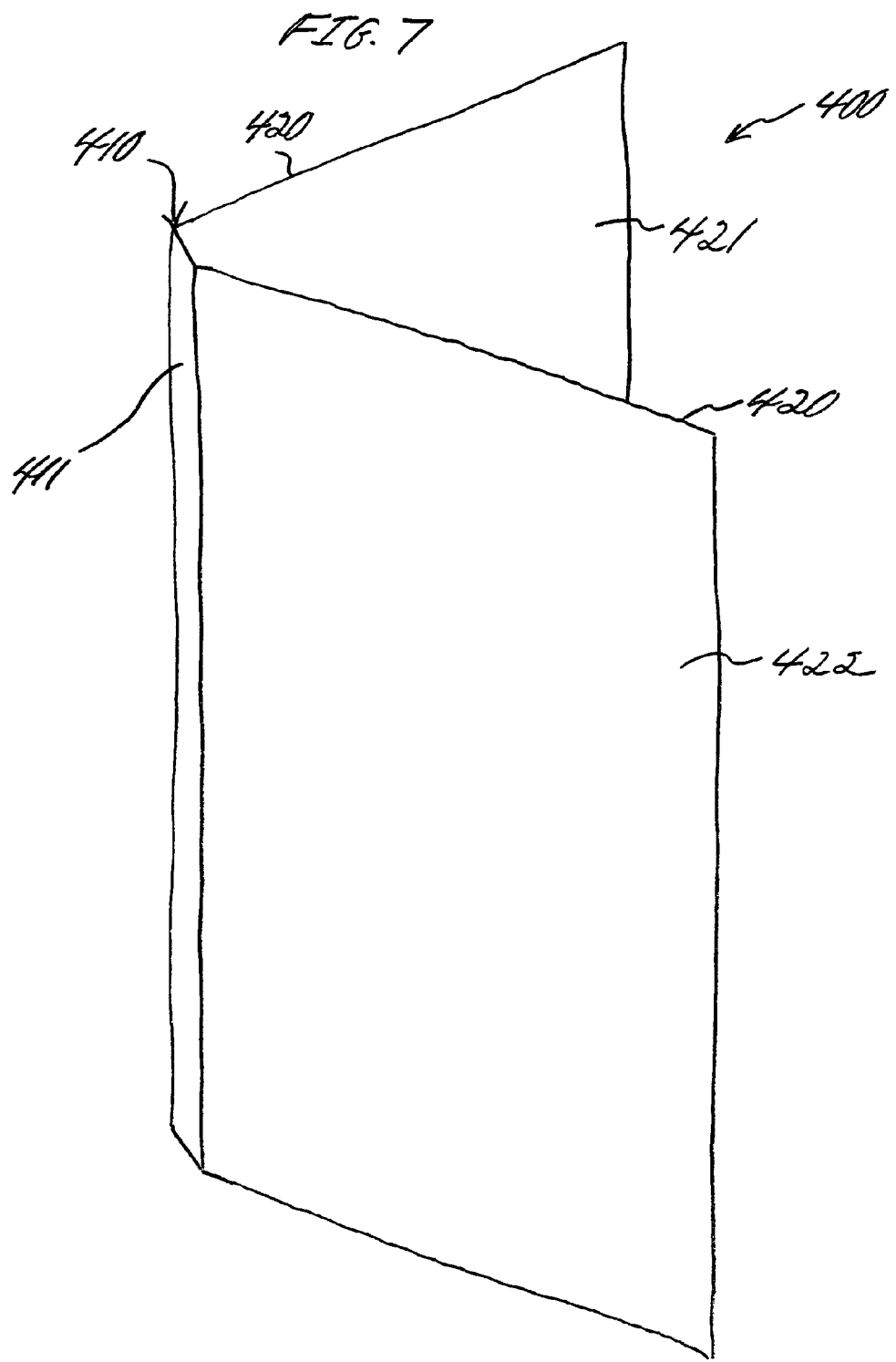
FIG. 7 is a perspective view of an automotive air deflector constructed in accordance with a fourth embodiment of the present invention.
Figure 8:
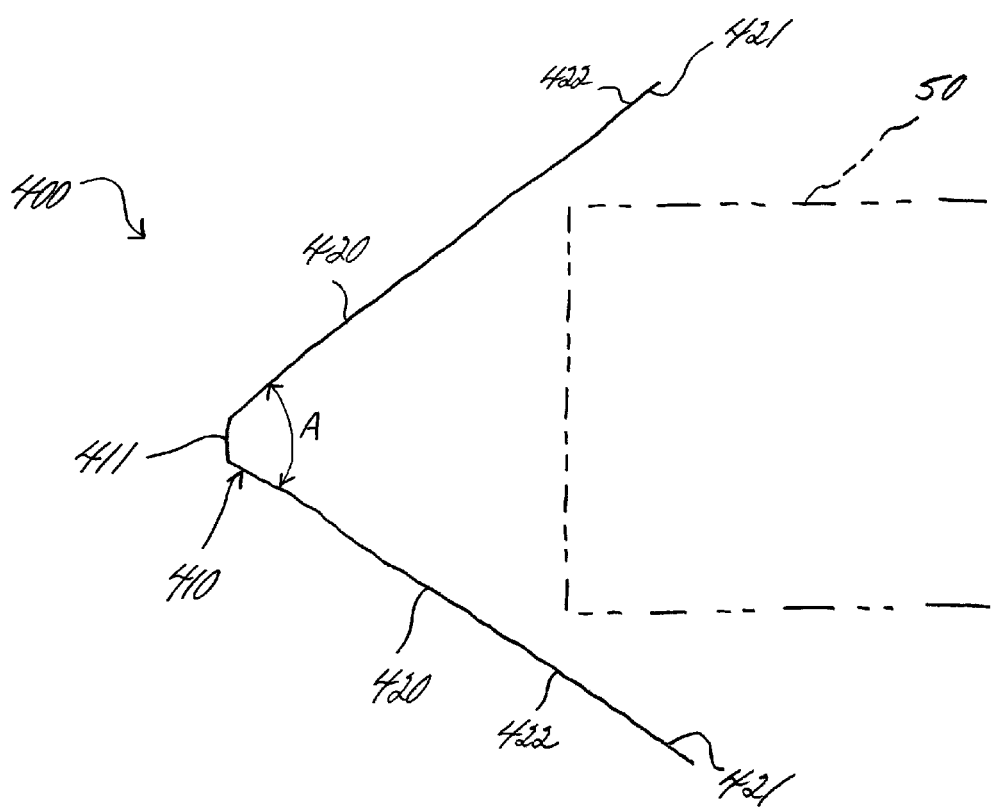
FIG. 8 is a plan view of the deflector shown in FIG. 7 positioned in association with a tire of a vehicle.

Referring now specifically to FIGS. 7 and 8 of the drawings, an automotive air deflector in accordance with a fourth embodiment of the present invention is generally designated by reference number 400. The deflector 400 includes a substantially V-shaped deflecting element 410 having a pair of opposed wing panels 420 each having an inner surface 421 and an outer surface 422 configured such that impinging air is directed around the outer surface 422 of the deflecting element 410. To facilitate the attachment of the deflecting element 410 to a front portion 41 of the wheel well 40, the deflecting element 410 includes a substantially flat portion disposed between each of the wing panels 420 so as to provide a deflector mounting surface 411.

Figure 9:
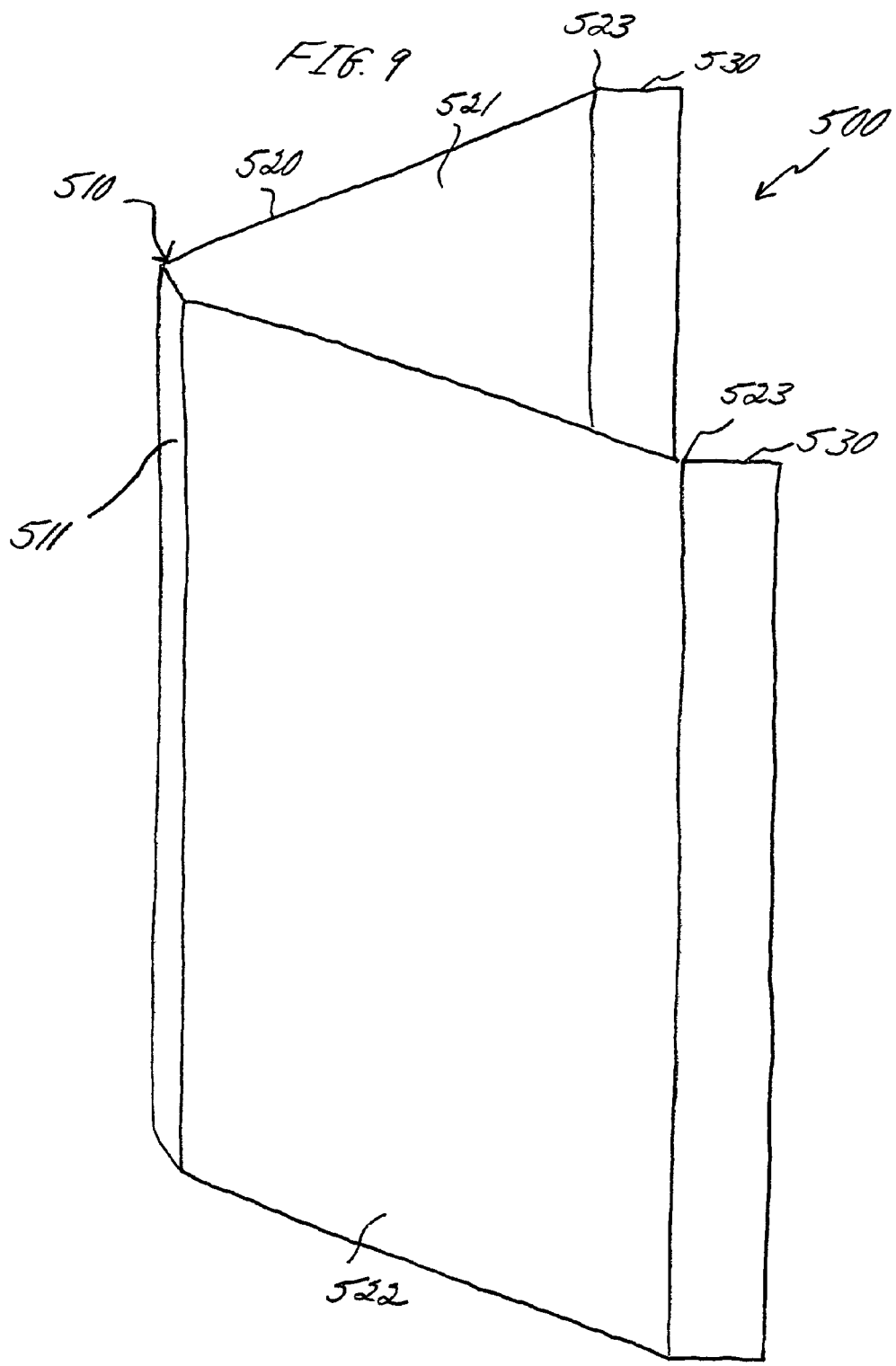
FIG. 9 is a perspective view of an automotive air deflector constructed in accordance with a fifth embodiment of the present invention.
Figure 10:
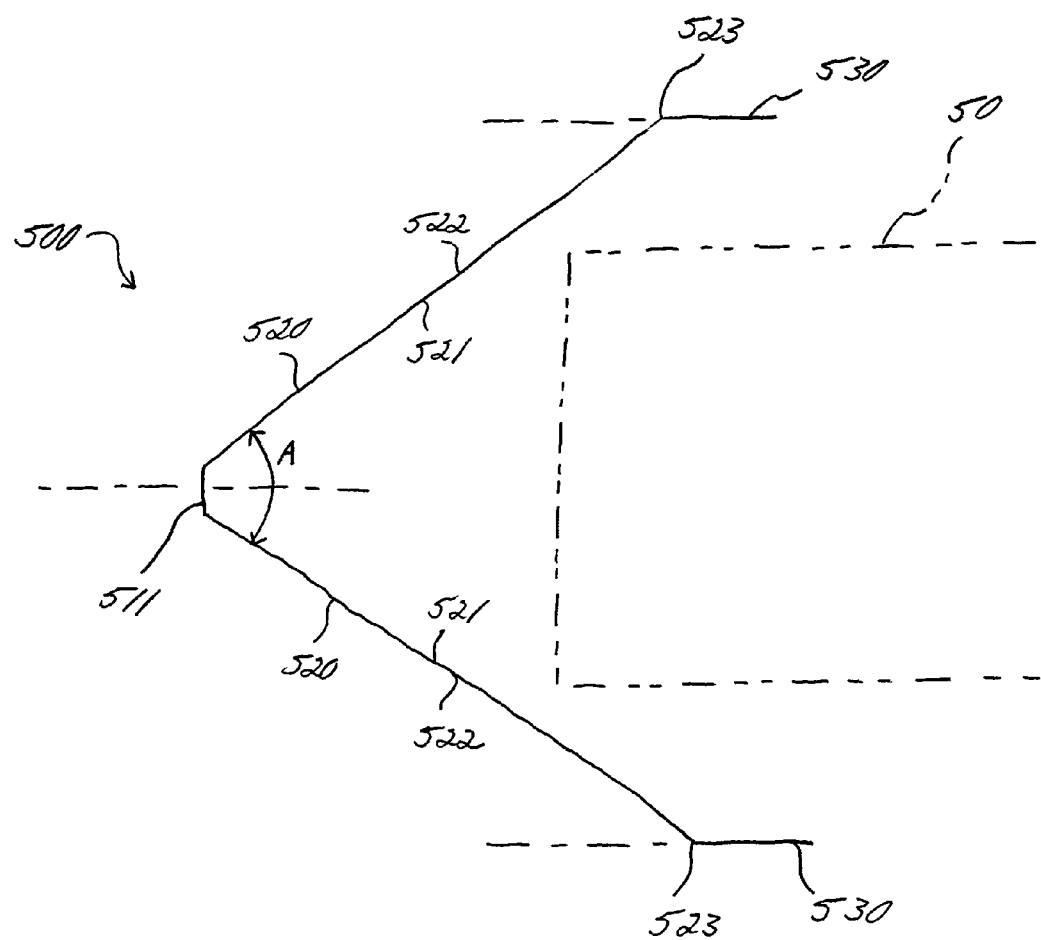
FIG. 10 is a plan view of the deflector shown in FIG. 9 positioned in association with a tire of a vehicle.

Referring now specifically to FIGS. 9 and 10 of the drawings, an automotive air deflector in accordance with a fifth embodiment of the present invention is generally designated by reference number 500. The deflector 500 includes a substantially V-shaped deflecting element 510 having a pair of opposed wing panels 520 each having an inner surface 521 and an outer surface 522 configured such that impinging air is directed around the outer surface 522 of the deflecting element 510. To facilitate the attachment of the deflecting element 510 to a front portion 41 of the wheel well 40, the deflecting element 510 includes a substantially flat portion disposed between each of the wing panels 520 so as to provide a deflector mounting surface 511. To further reduce the effect of aerodynamic drag, the deflecting element 510 includes a wing extension 530 on each of the wing panels 520. The wing extensions 530 extend from a rear edge 523 of the wing panel 520 and are oriented substantially parallel to a bisector of the angle between the wing panels 520.

According to still another embodiment of the present invention, a system of automotive air deflectors is provided in association with a vehicle. FIG. 12 shows a plurality of the deflectors 100 as shown in FIG. 1 positioned in a substantially horizontal orientation on a front end 20 of automobile 10. By positioning the deflectors 100 in a substantially horizontal orientation, the impinging air is deflected both over and under the front bumper 21 of the automobile 10.

FIG. 13 shows a plurality of the deflectors 100 as shown in FIG. 1 positioned in a substantially horizontal orientation on a rear end 30 of an automobile 10. By positioning the deflectors 100 in a substantially horizontal orientation on a rear bumper 31, i.e., on a bottommost portion 32 of a rear face 33 of the rear bumper 31, the impinging air is deflected over the rear bumper 31 of the automobile 10.

Figure 14:
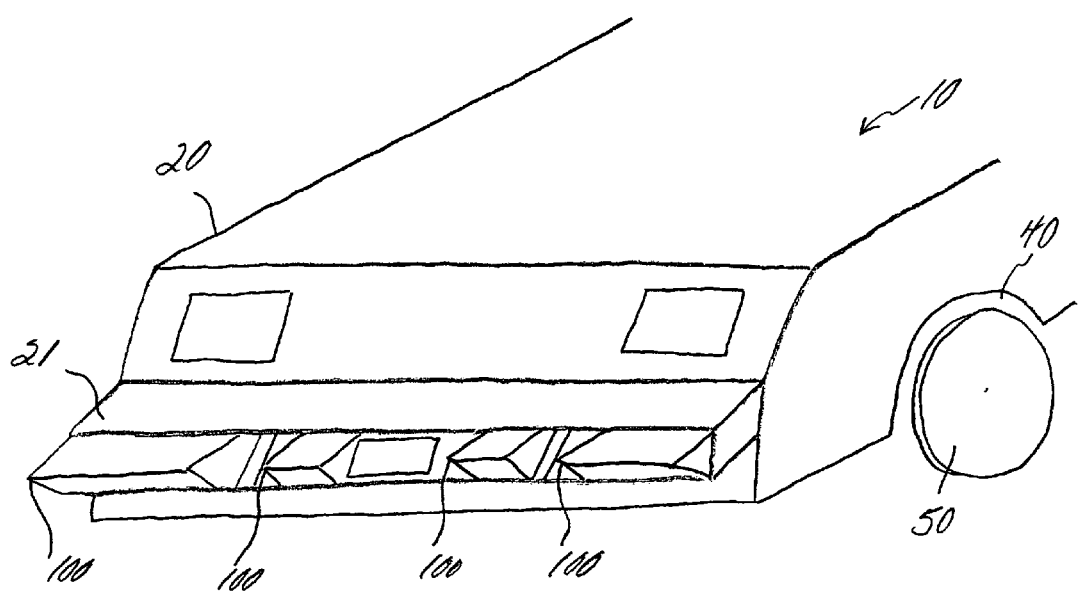
FIG. 14 is a perspective view of a plurality of deflectors of various lengths positioned in a substantially horizontal orientation on a front end of a vehicle.

FIG. 14 shows a plurality of the deflectors 100 of various lengths positioned in a substantially horizontal orientation on a front end 20 of an automobile 10. By positioning the deflectors 100 in a substantially horizontal orientation, the impinging air is deflected both over and under the front bumper 21 of the automobile 10. The exact combination of deflectors 100 that is required, i.e., the quantity and length of the deflectors, depends upon the specific configuration of the front end 20 of the automobile 10. For example, the deflectors 100 must be configured so as to avoid obscuring the license plate of the automobile 10. However, in general, by maximizing the length of the deflector(s) 100, air deflection is maximized and the labor associated with affixing the deflector 100 to the front bumper 21 is minimized.

Figure 15:
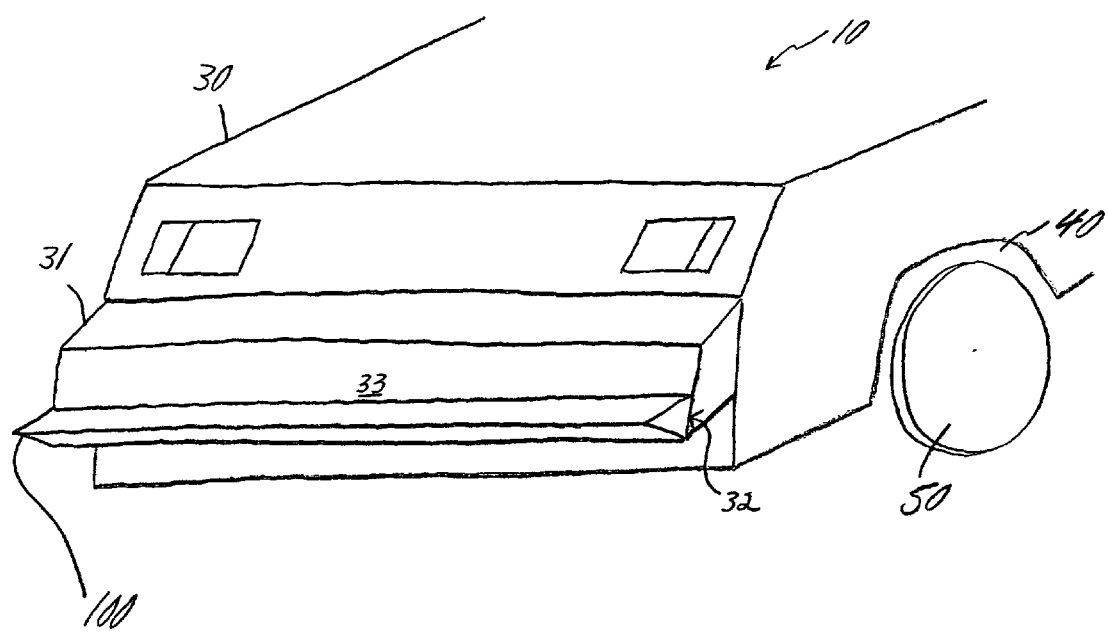
FIG. 15 is a perspective view of a single deflector positioned in a substantially horizontal orientation on a rear end of a vehicle.

FIG. 15 shows a single deflector 100 positioned in a substantially horizontal orientation on a rear end 30 of an automobile 10. By positioning the deflector 100 in a substantially horizontal orientation, the impinging air is deflected over the rear bumper 31 of the automobile 10. In general, by using a single deflector 100 in association with the entire length of the rear bumper 31, air deflection is maximized and the labor associated with affixing the deflector 100 to the rear bumper 31 is minimized.

Further road testing of the vehicle described above with a plurality of the deflectors 100 positioned in the substantially horizontal orientation on both the front end 20 and the rear end 30 (see FIGS. 12 and 13) also demonstrated the improved aerodynamic characteristics as evidenced by improved fuel efficiency, i.e., better gasoline mileage. By virtue of utilizing the deflectors 100 on the front bumper 21 and the rear bumper 31, the fuel mileage improved by approximately 25%.

Figure 16:
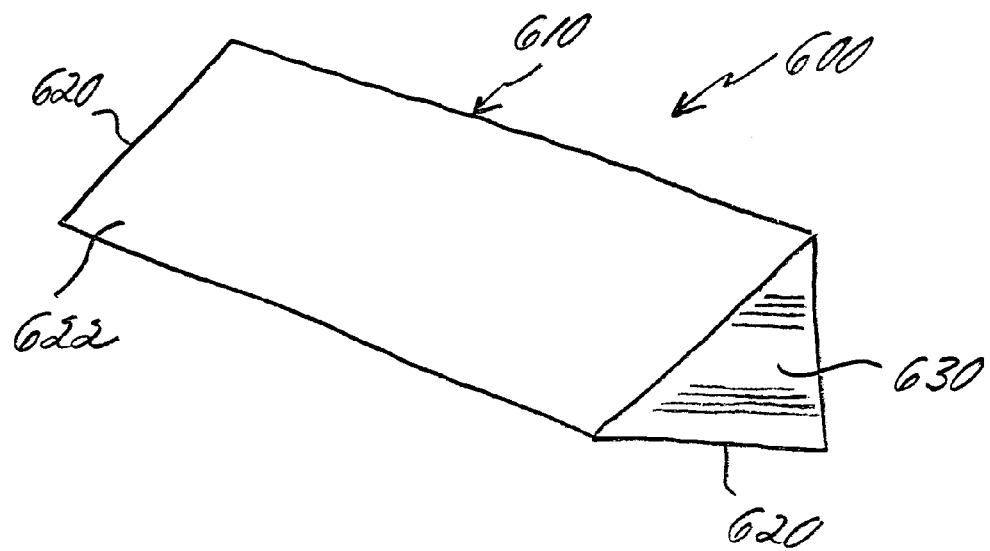
FIG. 16 is a perspective view of an automotive air deflector constructed in accordance with a sixth embodiment of the present invention.
Figure 17:
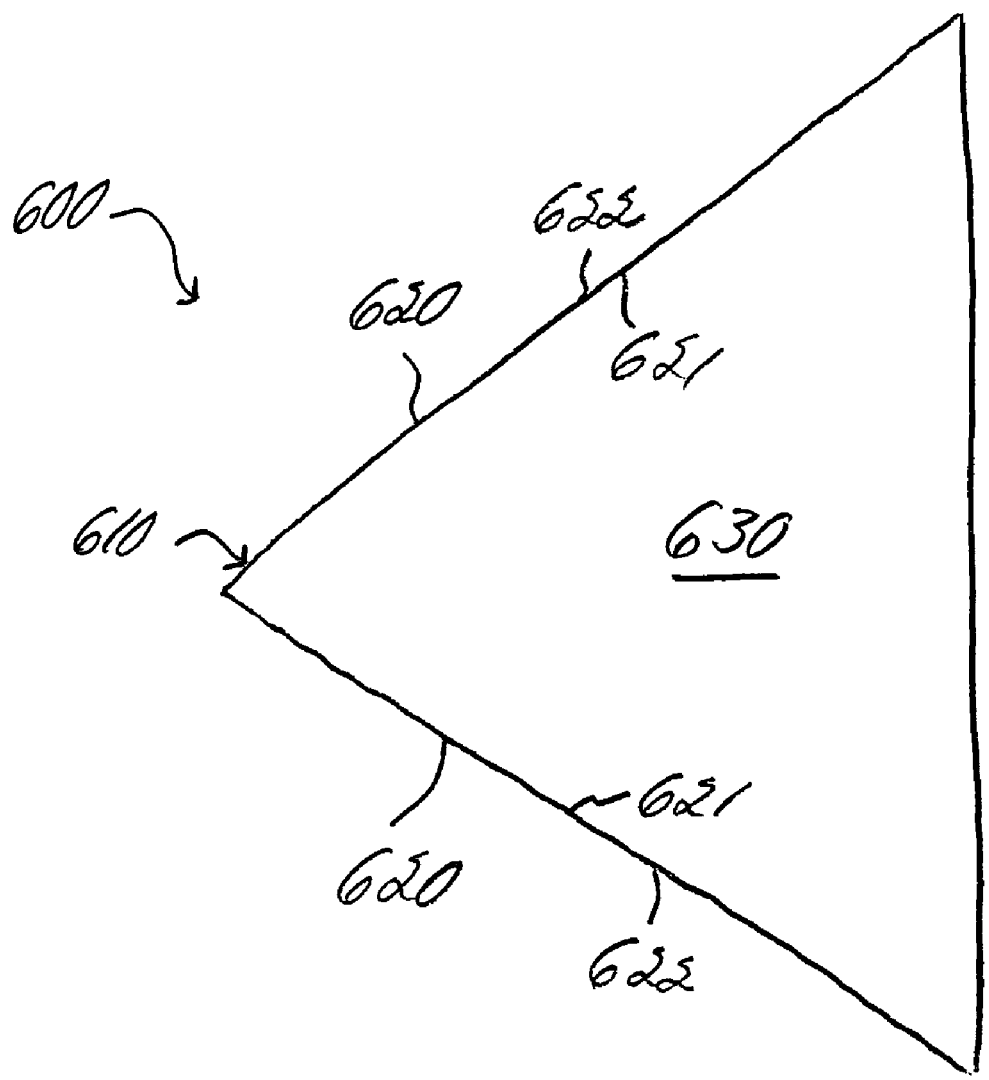
FIG. 17 is a plan view of the deflector shown in FIG. 16.

Referring now specifically to FIGS. 16 and 17 of the drawings, an automotive air deflector in accordance with a sixth embodiment of the present invention is generally designated by reference number 600. The deflector 600 includes a substantially V-shaped deflecting element 610 having a pair of opposed wing panels 620 each having an inner surface 621 and an outer surface 622 configured such that impinging air is directed around the outer surface 622 of the deflecting element 610. In addition, the deflector 600 has a pair of opposed end panels 630 that enclose the ends of the deflector 600 between the wing panels 620. It is believed that the opposed end panels 630 can aid in still further reducing the aerodynamic drag associated with both the front end 20 and the rear end 30 of the automobile 10.

Figure 18:
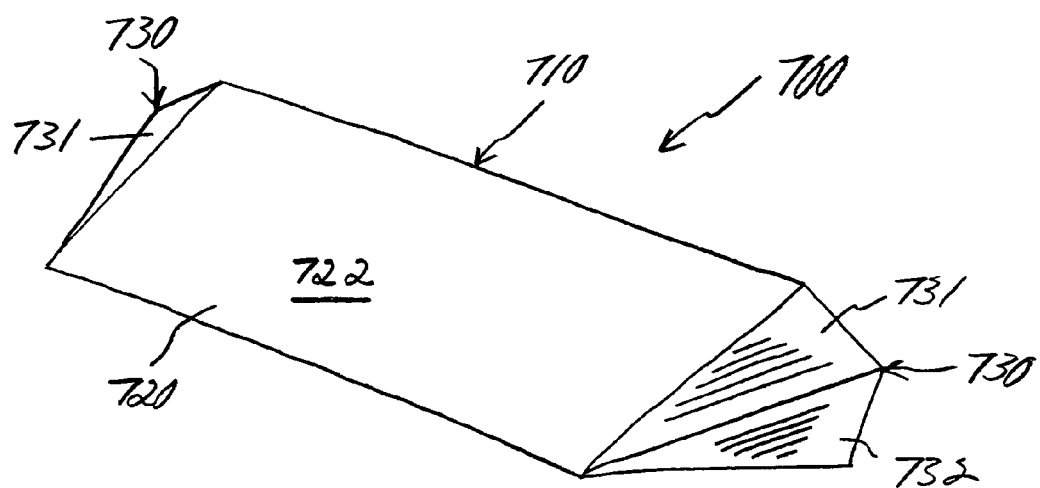
FIG. 18 is a perspective view of an automotive air deflector constructed in accordance with a seventh embodiment of the present invention.
Figure 19:
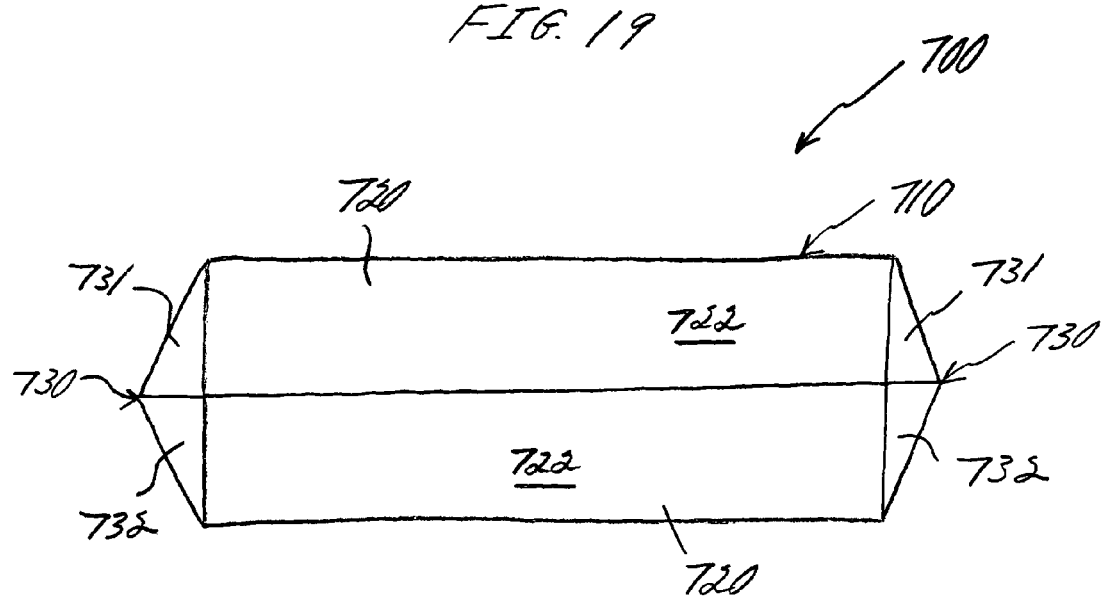
FIG. 19 is a front view of the deflector shown in FIG. 18.

Referring now specifically to FIGS. 18 and 19 of the drawings, an automotive air deflector in accordance with a seventh embodiment of the present invention is generally designated by reference number 700. The deflector 700 includes a substantially V-shaped deflecting element 710 having a pair of opposed wing panels 720 each having an inner surface 721 and an outer surface 722 configured such that impinging air is directed around the outer surface 722 of the deflecting element 710. In addition, the deflector 700 has a pair of opposed end portions 730 that enclose the ends of the deflector 700 between the wing panels 720. Each of the end portions 730 includes opposed angled panels 731 and 732. It is believed that the opposed end portions 730 aid in still further reducing the aerodynamic drag associated with both the front end 20 and the rear end 30 of the automobile 10. Further road testing of the vehicle described above demonstrated that by utilizing the deflectors 700 on the front bumper 21 and the rear bumper 31, the fuel mileage improved by approximately 3 miles per gallon.

Figure 20:
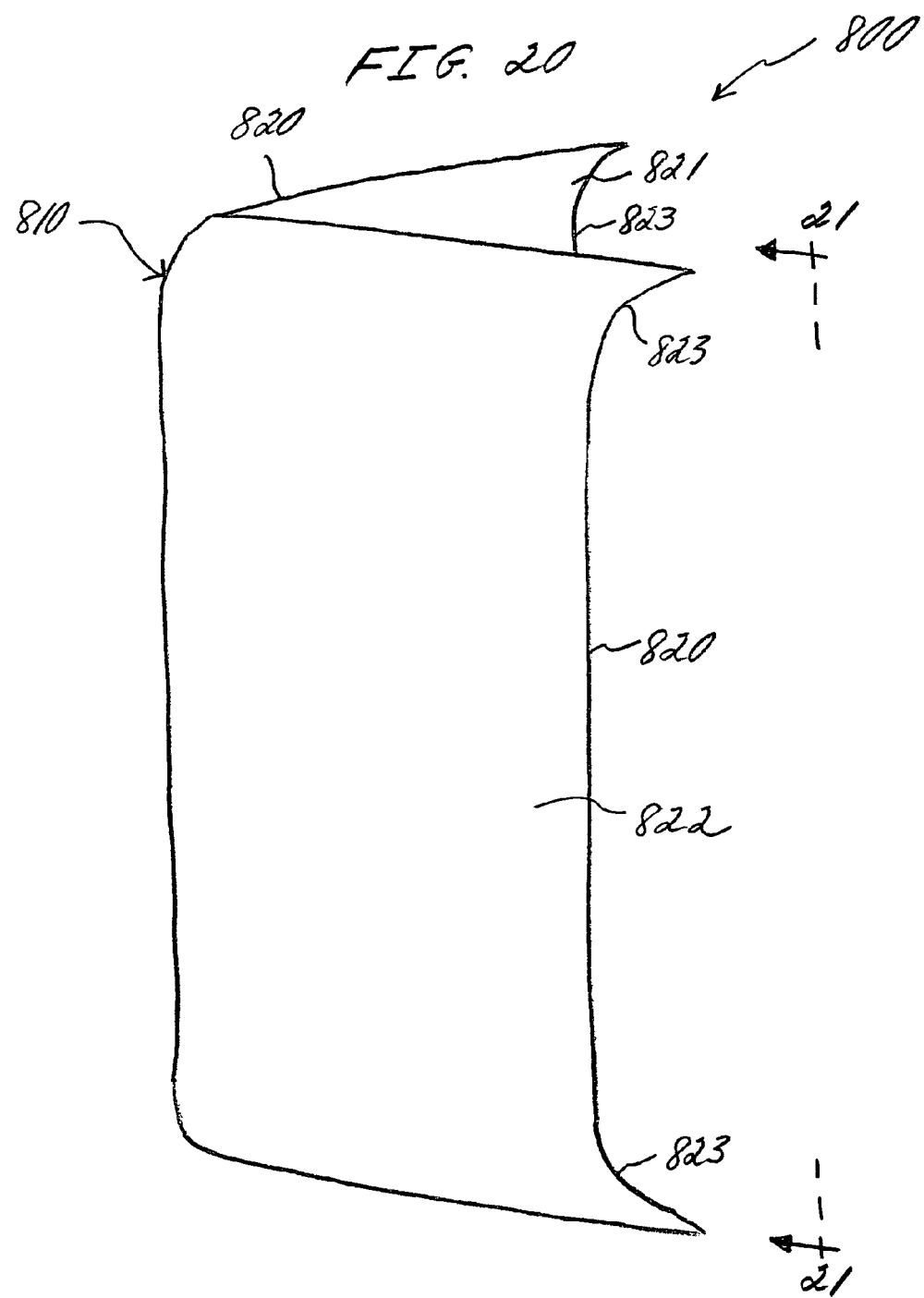
FIG. 20 is a perspective view of an automotive air deflector constructed in accordance with an eighth embodiment of the present invention.
Figure 21:
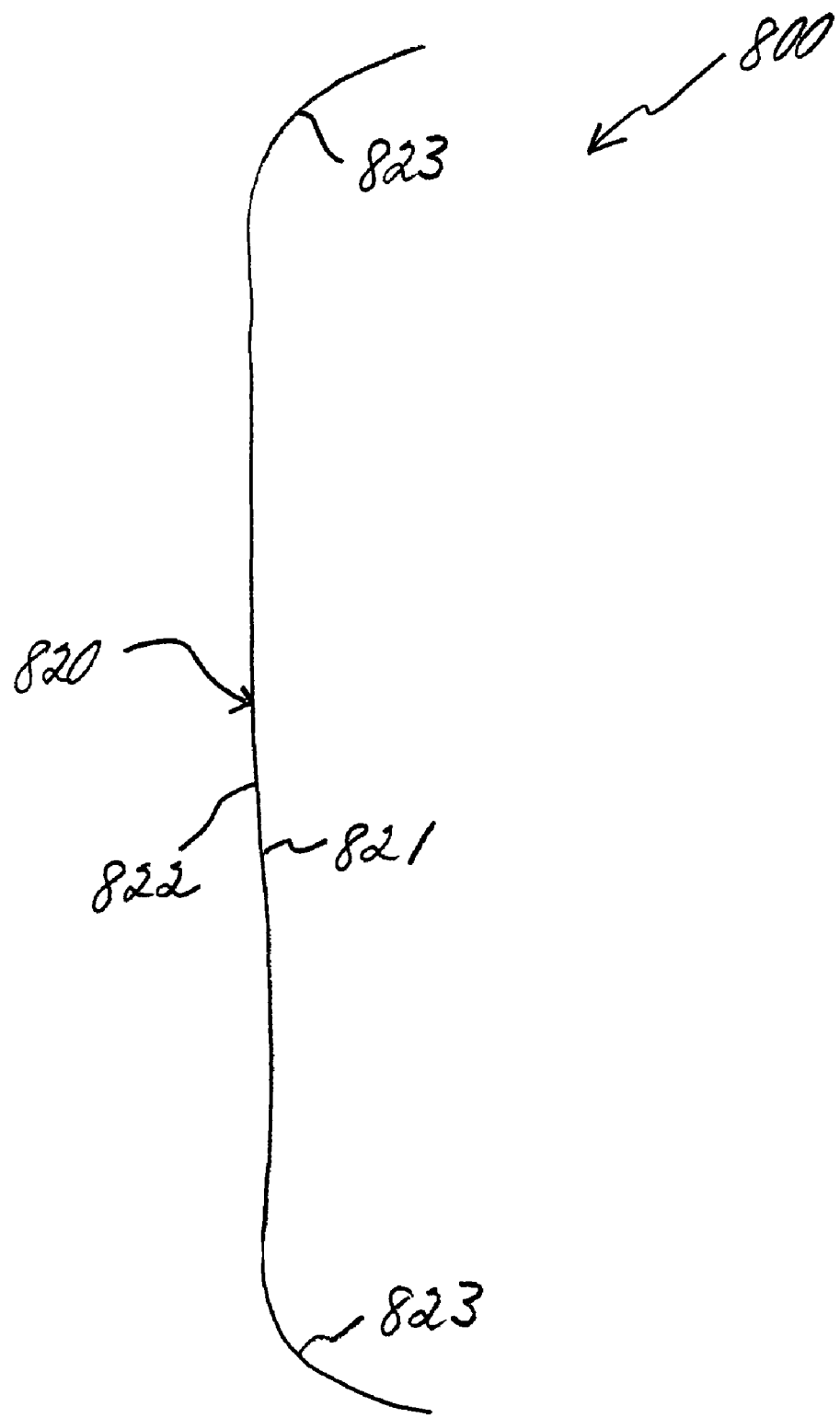
FIG. 21 is a partial rear view of the deflector taken along line 21-21 in FIG. 20.

Referring now specifically to FIGS. 20 and 21 of the drawings, an automotive air deflector in accordance with an eighth embodiment of the present invention is generally designated by reference number 800. The deflector 800 includes a substantially V-shaped deflecting element 810 having a pair of opposed wing panels 820 each having an inner surface 821 and an outer surface 822 configured such that impinging air is directed around the outer surface 822 of the deflecting element 810. In addition, each of the wing panels 820 has a curved panel portion 823 located at both a topmost and a bottommost portion of the wing panels 820. See FIG. 21, which is a partial rear view of the wing panel 820 taken along line 21-21 in FIG. 20. By virtue of employing the curved panel portions 823, the deflecting element 810 is able to direct even more of the impinging air around the tire 50.

The foregoing is considered as illustrative only of the principles of the invention. The automotive vehicle with which the air deflector is incorporated has been described for purposes of illustration as an automobile. However, the air deflector is contemplated for use with other types of automotive vehicles in which having the improved aerodynamic characteristics provided by the instant invention would be desirable. Such other types of automotive vehicles include, for example, various types of trucks, and buses.

It is not intended that the present invention be limited to the specific embodiments described herein. The foregoing is considered as illustrative only of the principles of the invention. For example, although the system of deflectors shown in FIGS. 12 and 13 depicts each deflector as being the open-ended embodiment, i.e., deflector 100, the deflectors could instead be the closed-ended embodiment, i.e., deflector 600. Further, the system could include a plurality of both the deflector 100 and the deflector 600, depending upon the particular air deflection service requirements.

Further, according to one embodiment of the invention, the deflector 100 has been described as being adapted to be positioned within the wheel well 40 in front of the rear tire 50 of the automobile 10. However, it is also contemplated that the deflector 100 could be used in association with the front tires of the automobile 10 as long as the deflector is configured and positioned to enable the front tires to turn laterally so as to steer the vehicle.

Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. An air deflector to reduce aerodynamic drag on an automotive vehicle, the automotive vehicle having a front bumper, a rear bumper and a plurality of wheel wells, said deflector comprising:
    a plurality of substantially V-shaped deflecting elements, each including a pair of opposed planar wing panels, each of the planar wing panels having an inner surface and an outer surface,
    said deflecting elements being rigid, bendable and shape retentive and dimensioned to fit entirely within an outer edge and an inner edge of the wheel wells of the automotive vehicle in a front wheel well portion and directing impinging air laterally around at least one of said outer surfaces so as to avoid impacting the wheel wells of said vehicle,
    wherein the deflecting elements also fits on one of a front outer face of the front bumper and a rear outer face of the rear bumper.

2. The air deflector according to claim 1, wherein an interior angle between said opposed wing panels is from approximately 80° to approximately 100°.

3. The air deflector according to claim 2, wherein said interior angle between said opposed wing panels is approximately 90°.

4. The air deflector according to claim 1, wherein said deflecting elements are positioned for use in front of rear tires in wheel wells of said vehicle.

5. The air deflector according to claim 1, wherein said deflecting elements are positioned for use in front of a front tire in the wheel well of said vehicle.

6. The air deflector according to claim 4, wherein said deflecting elements are positioned in a substantially vertical orientation so as to deflect air around each side of said tires.

7. The air deflector according to claim 2, further comprising a wing extension on each of said wing panels, said wing extension extending from a rear edge of said wing panel and being oriented substantially parallel to a bisector of said interior angle.

8. The air deflector according to claim 2, further comprising a wing extension on each of said wing panels, said wing extension extending from a rear edge of said wing panel and being oriented substantially perpendicular to a plane of said wing panel.

9. The air deflector according to claim 1, further comprising a substantially flat portion disposed between each of said wing panels so as to provide a deflector mounting surface adapted for attaching said deflectors to wheel wells of said vehicle.

10. The air deflector according to claim 1, wherein said deflecting elements are positioned in a substantially horizontal orientation so as to deflect said impinging air both over and under said front bumper.

11. The air deflector according to claim 1, said deflecting elements further comprising a pair of opposed end panels that enclose ends of said deflecting element between said wing panels.

12. The air deflector according to claim 1, wherein said deflecting elements are positioned in a substantially horizontal orientation on a bottommost portion of the rear outer face of said rear bumper so as to deflect said impinging air over said rear bumper.

13. The air deflector according to claim 1, wherein said deflecting elements have a material of construction that is metal.

14. The air deflector according to claim 1, wherein said deflecting elements have a material of construction that is thermoplastic.

15. An air deflector to reduce aerodynamic drag on an automotive vehicle, said deflector comprising:
a plurality of substantially V-shaped deflecting elements, each including a pair of opposed wing panels each having an inner surface and an outer surface,
said deflecting elements being dimensioned to fit entirely within and in a substantially vertical orientation within an inner edge and an outer edge of wheel wells of said vehicle and secured in said wheel wells in front of tires of said vehicle such that impinging air is directed laterally around at least one of said surfaces so as to avoid impacting said tires, thereby reducing said aerodynamic drag.

16. The air deflector according to claim 15, wherein an interior angle between said opposed wing panels is from approximately 80° to approximately 100°.

17. A system of air deflectors to reduce aerodynamic drag on an automotive vehicle, said system comprising:
a plurality of substantially V-shaped deflecting elements including a pair of opposed wing panels each having an inner surface and an outer surface, said deflecting elements directing impinging air laterally around at least one of said surfaces so as to avoid impacting an aerodynamic obstruction associated with said vehicle,
said deflecting elements being positioned entirely within an inner edge and an outer edge of a tire wheel well of said vehicle, secured in a front wheel well portion, wherein the deflecting elements also fit on a front outer face of a front bumper of said vehicle, and a rear outer face of a rear bumper of said vehicle.

18. The system of air deflectors according to claim 17, wherein said deflecting element associated with said tire is positioned in a substantially vertical orientation so as to deflect air around each side of said tire, and wherein said deflecting elements associated with said front bumper and said rear bumper are positioned in a substantially horizontal orientation so as to deflect said impinging air over and under said front bumper and over said rear bumper.

* * * * *